(12) United States Patent
Sun et al.

(10) Patent No.: US 8,699,324 B2
(45) Date of Patent: Apr. 15, 2014

(54) METHOD, APPARATUS AND SYSTEM FOR PROCESSING CONFIGURATION UPDATE FAILURE

(75) Inventors: Lianqiao Sun, Shenzhen (CN); Yi Wang, Shenzhen (CN); De Yang, Shenzhen (CN)

(73) Assignee: ZTE Corporation, Shenzhen, Guangdong (CN)

( * ) Notice: Subject to any disclaimer, the term of this patent is extended or adjusted under 35 U.S.C. 154(b) by 257 days.

(21) Appl. No.: 13/258,117

(22) PCT Filed: Apr. 20, 2010

(86) PCT No.: PCT/CN2010/071920
§ 371 (c)(1),
(2), (4) Date: Sep. 21, 2011

(87) PCT Pub. No.: WO2011/003292
PCT Pub. Date: Jan. 13, 2011

(65) Prior Publication Data
US 2012/0099417 A1    Apr. 26, 2012

(30) Foreign Application Priority Data

Jul. 10, 2009   (CN) .......................... 2009 1 0158544

(51) Int. Cl.
*G01R 31/08*    (2006.01)
*H04L 1/00*    (2006.01)
(52) U.S. Cl.
USPC ........... 370/216; 370/328; 370/252; 370/219; 370/329; 709/223; 709/224

(58) Field of Classification Search
USPC .......... 370/216, 328, 252, 219, 329; 709/223, 709/224
See application file for complete search history.

(56) References Cited

U.S. PATENT DOCUMENTS

2009/0049355 A1    2/2009 Frederiksen

FOREIGN PATENT DOCUMENTS

JP    2007336179 A    12/2007
WO    2009024908 A2    2/2009

OTHER PUBLICATIONS

International Search Report on international application No. PCT/CN2010/071920, mailed on Jul. 15, 2010.
English Translation of the Written Opinion of the International Search Authority in international application No. PCT/CN2010/071920, mailed on Jul. 15, 2010.
Abnormal Conditions for eNB Configuration Update Nov. 10, 2008.
Configuration Update repetition Sep. 9, 2008.
eNB Configuration Update procedures update for ANR Sep. 30, 2008.
Technical Specification Group Radio Access Network Jun. 2009.

*Primary Examiner* — Charles C Jiang
*Assistant Examiner* — Jamal Javaid
(74) *Attorney, Agent, or Firm* — Oppedahl Patent Law Firm LLC (57) ABSTRACT

The present disclosure relates to a method, apparatus and system for processing a configuration update failure, belonging to the field of communications. The method includes: setting a times threshold for receiving an eNB configuration update failure message; sending an eNB configuration update message to an MME or a neighboring eNB after configuration information is updated; receiving, from the MME or the neighboring eNB, an eNB configuration update failure message including a Time-To-Wait IE; calculating the times for receiving the eNB configuration update failure message; comparing the calculated times for receiving the eNB configuration update failure message with the set times threshold to determine whether the calculated times exceed the set times threshold; and stopping sending the eNB configuration update message if the calculated times exceed the set times threshold. The apparatus includes: a first sending module, a first receiving module, a first counting module, a first threshold setting module, a first comparing module and a first notifying module. The present disclosure can relieve the load of the system and improve the robustness and stability of the system.

20 Claims, 6 Drawing Sheets

METHOD, APPARATUS AND SYSTEM FOR PROCESSING CONFIGURATION UPDATE FAILURE

TECHNICAL FIELD

The present disclosure relates to the field of communications, and particularly relates to a method, apparatus and system for processing a configuration update failure.

BACKGROUND

In a Long Term Evolution (LTE) system, after an S1 SETUP or X2 SETUP process is successfully completed between an evolved NodeB (eNB) and a Mobility Management Entity (MME) of a neighboring network element or another neighboring eNB, the eNB informs, via an evolved NodeB configuration update (ENB CONFIGURATION UPDATE) message, the MME or the another neighboring eNB of a change in the related configuration information at the eNB side. If the eNB receives an eNB configuration update failure (ENB CONFIGURATION UPDATE FAILURE) message including a Time To Wait Information Element (Time-To-Wait IE) from the MME or the another neighboring eNB after sending the ENB CONFIGURATION UPDATE message, then the eNB resends, no matter whether the current configuration thereof is changed, the ENB CONFIGURATION UPDATE message to the MME or the another neighboring eNB after at least the time indicated by the Time-To-Wait IE. If the MME or the another neighboring eNB continues to respond an ENB CONFIGURATION UPDATE FAILURE message including a Time-To-Wait IE, then the eNB restarts, no matter whether the configuration thereof is changed, an ENB CONFIGURATION UPDATE process after similarly at least the time indicated by the Time-To-Wait IE. That is, if the eNB always receives, from the MME or the another neighboring eNB, an ENB CONFIGURATION UPDATE FAILURE message including a Time-To-Wait IE after sending an ENB CONFIGURATION UPDATE message while the configuration information of the eNB is not changed, then there will cause a problem that the eNB may repeat a process of initiating the same ENB CONFIGURATION UPDATE, leading to a significant increase in the load of a system and a reduction in the robustness and stability of the system.

Similarly, the MME will confront the same problem as the eNB when informing the eNB of a change in the related configuration information at an MME side via a mobility management entity configuration update (MME CONFIGURATION UPDATE) message, that is, if the MME always receives, from the eNB, an MME configuration update failure (MME CONFIGURATION UPDATE FAILURE) message including a Time-To-Wait IE after sending an MME CONFIGURATION UPDATE message while the configuration information of the MME is not changed, then there will cause a problem that the MME will repeat a process of initiating the same MME CONFIGURATION UPDATE, leading to a significant increase in the load of the system and a reduction in the robustness and stability of the system.

SUMMARY

To this technical problem, the present disclosure provides a method, apparatus and system for processing a configuration update failure, so as to relieve the load of a system and improve the robustness and stability of the system.

In order to solve the aforementioned technical problem, the present disclosure provides a method, apparatus and system for processing a configuration update failure, and the specific technical solution of the present disclosure is realized by:

The present disclosure provides a method for processing a configuration update failure, setting a times threshold of receiving an evolved NodeB (eNB) configuration update failure message, the method comprises:

sending an eNB configuration update message to a Mobility Management Entity (MME) or a neighboring eNB after configuration information is updated;

receiving, from the MME or the neighboring eNB, an eNB configuration update failure message including a Time-To-Wait IE;

calculating the times of receiving the eNB configuration update failure message;

comparing the calculated times of receiving the eNB configuration update failure message with the set times threshold to determine whether the calculated times exceed the set times threshold; and stopping sending the eNB configuration update message if the calculated times exceed the set times threshold.

Wherein the method may further comprise the following steps of:

determining whether the configuration information is updated within a waiting time designated by the Time-To-Wait IE; and resetting the initial value of the times of receiving the eNB configuration update failure message if the configuration information is updated within the waiting time designated by the Time-To-Wait IE.

The present disclosure provides a method for processing a configuration update failure, setting a times threshold for receiving an MME configuration update failure message, the method comprises:

sending an MME configuration update message to an eNB after configuration information is updated;

receiving, from the eNB, an MME configuration update failure message including a Time-To-Wait IE;

calculating the times of receiving the MME configuration update failure message;

comparing the calculated times of receiving the MME configuration update failure message with the set times threshold to determine whether the calculated times exceed the set times threshold; and stopping sending the MME configuration update message if the calculated times exceeds the set times threshold.

Wherein the method may further comprise:

determining whether the configuration information is updated within the waiting time designated by the Time-To-Wait IE; and resetting the initial value of the times of receiving the MME configuration update failure message if the configuration information is updated within the waiting time designated by the Time-To-Wait IE.

The present disclosure provides a method for processing a configuration update failure, setting a time threshold, the method comprises:

sending an eNB configuration update message to an MME or a neighboring eNB after configuration information is updated;

receiving, from the MME or the neighboring eNB, an eNB configuration update failure message including a Time-To-Wait IE;

accumulating time lengths designated by the Time-To-Wait IEs included in the received eNB configuration update failure messages;

comparing the accumulated value of the time lengths designated by the Time-To-Wait IEs included in the received eNB configuration update failure messages with the set time threshold to determine whether the accumulated value of the time lengths exceeds the set time threshold; and stopping sending the eNB configuration update message if the accumulated value of the time lengths exceeds the set time threshold.

Wherein the method may further comprise:

determining whether the configuration information is updated within the time length designated by the Time-To-Wait IE; and resetting an initial value of the time length if the configuration information is updated within the time length designated by the Time-To-Wait IE.

The present disclosure provides a method for processing a configuration update failure, setting a time threshold, the method comprises:

sending an MME configuration update message to an eNB after configuration information is updated;

receiving, from the eNB, an MME configuration update failure message including a Time-To-Wait IE;

accumulating the time lengths designated by the Time-To-Wait IEs included in the received MME configuration update failure messages;

comparing the accumulated value of the time lengths designated by the Time-To-Wait IEs included in the received eNB configuration update failure messages with the set time threshold to determine whether the accumulated value of the time lengths exceeds the set time threshold; and stopping sending the MME configuration update message if the accumulated value of the time lengths designated by the Time-To-Wait IEs exceeds the set time threshold.

Wherein the method may further comprise:

determining whether the configuration information is updated within the time length designated by the Time-To-Wait IE received from the eNB; and resetting the initial value of the accumulated time lengths if the configuration information is updated within the time length designated by the Time-To-Wait IE received from the eNB.

The present disclosure further provides an apparatus for processing a configuration update failure, and the apparatus comprises a first sending module, a first receiving module, a first counting module, a first threshold setting module, a first comparing module and a first notifying module, wherein the first threshold setting module is configured to set a times threshold for receiving an eNB configuration update failure message;

the first sending module, connected with the first receiving module, is configured to send an eNB configuration update message to an MME or a neighboring eNB after configuration information is updated;

the first receiving module is configured to receive, from the MME or the neighboring eNB, an eNB configuration update failure message including a Time-To-Wait IE;

the first counting module, connected with the first receiving module, is configured to calculate the times of receiving the eNB configuration update failure message by the first receiving module;

the first comparing module, connected with the first counting module and the first threshold setting module, is configured to compare the times of receiving the eNB configuration update failure message which are calculated by the first counting module with the times threshold set by the first threshold setting module to determine whether the calculated times exceed the set times threshold; and the first notifying module, connected with the first sending module and the first comparing module, is configured to notify the first sending module to stop sending the eNB configuration update message when the first compassion module determines that the times of receiving the eNB configuration update failure message exceed the times threshold set by the first threshold setting module.

Wherein the apparatus may further comprise a first determining module and a first resetting module, wherein the first determining module, connected with the first receiving module, is configured to determine whether the configuration information is updated within the waiting time designated by the Time-To-Wait IE; and the first resetting module, connected with the first determining module, is configured to reset an initial value of the times of receiving the eNB configuration update failure message which are calculated by the first counting module when the first determining module determines that the configuration information is updated within the waiting time designated by the Time-To-Wait IE.

The present disclosure further provides an apparatus for processing a configuration update failure, the apparatus comprises a second sending module, a second receiving module, a second counting module, a second threshold setting module, a second comparing module and a second notifying module, wherein the second threshold setting module is configured to set a times threshold for receiving an MME configuration update failure message;

the second sending module, connected with the second receiving module, is configured to send the MME configuration update message to an eNB after configuration information is updated;

the second receiving module is configured to receive, from the eNB, an MME configuration update failure message including a Time-To-Wait IE;

the second counting module, connected with the second receiving module, is configured to calculate the times of receiving the MME configuration update failure message by the second receiving module;

the second comparing module, connected with the second counting module and the second threshold setting module, is configured to compare the times of receiving the MME configuration update failure message calculated by the second counting module with the times threshold set by the second threshold setting module to determine whether the calculated times exceed the set times threshold; and the second notifying module, connected with the second comparing module, is configured to notify the second sending module to stop sending the MME configuration update message when the second comparing module determines that the times of receiving the MME configuration update failure message exceeds the times threshold set by the second threshold setting module.

Wherein the apparatus may further comprise a second determining module and a second resetting module, wherein the second determining module, connected with the second receiving module, is configured to determine whether the configuration information is updated within the waiting time designated by the Time-To-Wait IE; and the second resetting module, connected with the second determining module, is configured to reset the initial value of the times of receiving the eNB configuration update failure message which are calculated by the second counting module when the second determining module determines that the configuration information is updated within the waiting time designated by the Time-To-Wait IE.

The present disclosure further provides an apparatus for processing a configuration update failure, the apparatus comprises a first sending module, a first receiving module, a first counting module, a first threshold setting module, a first comparing module and a first notifying module, wherein the first threshold setting module is configured to set a time threshold;

the first sending module, connected with the first receiving module, is configured to send an eNB configuration update message to an MME or a neighboring eNB after configuration information is updated;

the first receiving module is configured to receive, from the MME or the neighboring eNB, an eNB configuration update failure message including a Time-To-Wait IE;

the first counting module, connected with the first receiving module, is configured to accumulate the time lengths designated by the Time-To-Wait IEs included in the eNB configuration update failure messages received by the first receiving module;

the first compassion module, connected with the first counting module and the first threshold setting module, is configured to compare the accumulated time length with the time threshold set by the first threshold setting module; and the first notifying module, connected with the first comparing module, is configured to notify the first sending module to stop sending the eNB configuration update message when the first comparing module determines that the accumulated time length exceeds the time threshold set by the first threshold setting module.

Wherein the apparatus may further comprise a first determining module and a first resetting module, wherein the first determining module, connected with the first receiving module, is configured to determine whether the configuration information is updated within the time length designated by the Time-To-Wait IE; and the first resetting module, connected with the first determining module, is configured to reset an initial value of the time length accumulated by the first counting module when the first determining module determines that the configuration information is updated within the time length designated by the Time-To-Wait IE.

The present disclosure further provides an apparatus for processing a configuration update failure, the apparatus comprises a second sending module, a second receiving module, a second counting module, a second threshold setting module, a second comparing module and a second notifying module, wherein the second threshold setting module is configured to set a time threshold;

the second sending module, connected with the second receiving module, is configured to send an MME configuration update message to an eNB after configuration information is updated;

the second receiving module is configured to receive, from the eNB, an MME configuration update failure message including a Time-To-Wait IE;

the second counting module, connected with the first receiving module, is configured to accumulate the time lengths designated by the Time-To-Wait IE included in the MME configuration update failure message received by the second receiving module;

the second threshold setting module is configured to set a time threshold for receiving the MME configuration update failure message;

the second compassion module, connected with the second counting module and the second threshold setting module, is configured to compare the accumulated time length with the time threshold set by the second threshold setting module; and the second notifying module, connected with the second comparing module, is configured to notify the second sending module to stop sending the MME configuration update message when the second comparing module determines that the accumulated time length exceeds the time threshold set by the second threshold setting module.

Wherein the apparatus may further comprise a second determining module and a second resetting module, wherein the second determining module, connected with the second receiving module, is configured to determine whether the configuration information is updated within the time length designated by the Time-To-Wait IE received by the second receiving module from the eNB; and the second resetting module, connected with the second determining module, is configured to reset an initial value of the time length accumulated by the second counting module when the second determining module determines that the configuration information is updated within the time length designated by the Time-To-Wait IE.

The present disclosure further provides a system for processing a configuration update failure, the system comprises a setting module, a first apparatus for processing a configuration update failure and a second apparatus for processing a configuration update failure connected with the first apparatus for processing a configuration update failure, wherein the setting module is configured to set a times threshold for receiving an eNB configuration update failure message;

the first apparatus for processing a configuration update failure is configured to send an eNB configuration update message to the second apparatus for processing a configuration update failure after configuration information is updated; receive, from the second apparatus for processing a configuration update failure, an eNB configuration update failure message including a Time-To-Wait IE; calculate the times of receiving the eNB configuration update failure message; compare the calculated times of receiving the eNB configuration update failure message with the set times threshold for receiving the eNB configuration update failure message to determine whether the calculated times exceed the set times threshold; and stop sending the eNB configuration update message when the calculated times exceed the set times threshold; and the second apparatus for processing a configuration update failure is configured to receive the eNB configuration update message from the first apparatus for processing a configuration update failure, and then send the eNB configuration update failure message including the Time-To-Wait IE to the first apparatus for processing a configuration update failure when an update is failed.

The present disclosure further provides a system for processing a configuration update failure, the system comprises a setting module, a first apparatus for processing a configuration update failure and a second apparatus for processing a configuration update failure connected with the first apparatus for processing a configuration update failure, wherein the setting module is configured to set a times threshold for receiving an MME configuration update failure message;

the first apparatus for processing a configuration update failure is configured to send an MME configuration update message to the second apparatus for processing a configuration update failure after configuration information is updated; and receive, from the second apparatus for processing a configuration update failure, an MME configuration update failure message including a Time-To-Wait IE; calculate the times of receiving the MME configuration update failure message; compare the calculated times of receiving the MME configuration update failure message with the set times threshold for receiving the MME configuration update failure message to determine whether the calculated times exceed the set times threshold; and stop sending the MME configuration update message when the calculated times exceed the set threshold times; and the second apparatus for processing a configuration update failure is configured to receive the MME configuration update message and send the MME configuration update failure message including the Time-To-Wait IE to the first apparatus for processing a configuration update failure when an update is failed.

The present disclosure further provides a system for processing a configuration update failure, the system comprises a setting module, a first apparatus for processing a configuration update failure and a second apparatus for processing a configuration update failure connected with the first apparatus for processing a configuration update failure, wherein the setting module is configured to set a time threshold;

the first apparatus for processing a configuration update failure is configured to send an eNB configuration update message to the second apparatus for processing a configuration update failure after configuration information is updated; receive, from the second apparatus for processing a configuration update failure, an eNB configuration update failure message including a Time-To-Wait IE; accumulate the time length designated by the Time-To-Wait IEs included in the received eNB configuration update failure messages; compare the accumulated value of the time lengths designated by the Time-To-Wait IEs with the set time threshold to determine whether the accumulated value of the time lengths exceeds the set time threshold; and stop sending the eNB configuration update message when the accumulated value of the time lengths designated by the Time-To-Wait IEs exceeds the set time threshold; and the second apparatus for processing a configuration update failure is configured to receive the eNB configuration update message from the first apparatus for processing a configuration update failure, and then send the eNB configuration update failure message including the Time-To-Wait IE to the first apparatus for processing a configuration update failure when an update is failed.

The present disclosure further provides a system for processing a configuration update failure, the system comprises a setting module, a first apparatus for processing a configuration update failure and a second apparatus for processing a configuration update failure connected with the first apparatus for processing a configuration update failure, wherein the setting module is configured to set a time threshold;

the first apparatus for processing a configuration update failure is configured to send an MME configuration update message to the second apparatus for processing a configuration update failure after configuration information is updated; receive, from the second apparatus for processing a configuration update failure, an MME configuration update failure message including a Time-To-Wait IE; accumulate the time lengths designated by the Time-To-Wait IEs included in the received MME configuration update failure messages; compare the accumulated value of the time lengths designated by the Time-To-Wait IEs with the set time threshold to determine whether the accumulated value of the time lengths exceeds the set time threshold; and stop sending the MME configuration update message when the accumulated value of the time lengths exceeds the set time threshold; and the second apparatus for processing a configuration update failure is configured to receive the MME configuration update message and send the MME configuration update failure message including the Time-To-Wait IE to the first apparatus for processing a configuration update failure when an update is failed.

By setting a times threshold or a time threshold to stop the sending of a configuration update message when accumulated times of receiving a configuration update failure message including a Time-To-Wait IE are received more than the times threshold or accumulated time for receiving a configuration update failure message including a Time-To-Wait IE is longer than the time threshold, the present disclosure solves the problem that the same update process is called repeatedly in the case that a configuration update failure message including a Time-To-Wait IE is always received from the opposite terminal and the configuration of the initiating terminal is not changed, and thereby it can relieve the load of a system and improve the robustness and stability of the system.

DETAILED DESCRIPTION

The basic idea of the present disclosure is that: by setting a times threshold or a time threshold to stop the sending of a configuration update message when accumulated times of receiving a configuration update failure message including a Time-To-Wait IE are more than the times threshold or accumulated time for receiving a configuration update failure message including a Time-To-Wait IE is longer than the time threshold, the present disclosure solves the problem that the same update process is called repeatedly in the case that a configuration update failure message including a Time-To-Wait IE is always received from the opposite terminal and the configuration of the initiating terminal is not changed, and thereby can relieve the load of the system and improve the robustness and stability of the system.

The technical solution of the present disclosure is described in detail in combination with the drawings and preferred embodiments hereinafter.

Figure 1:
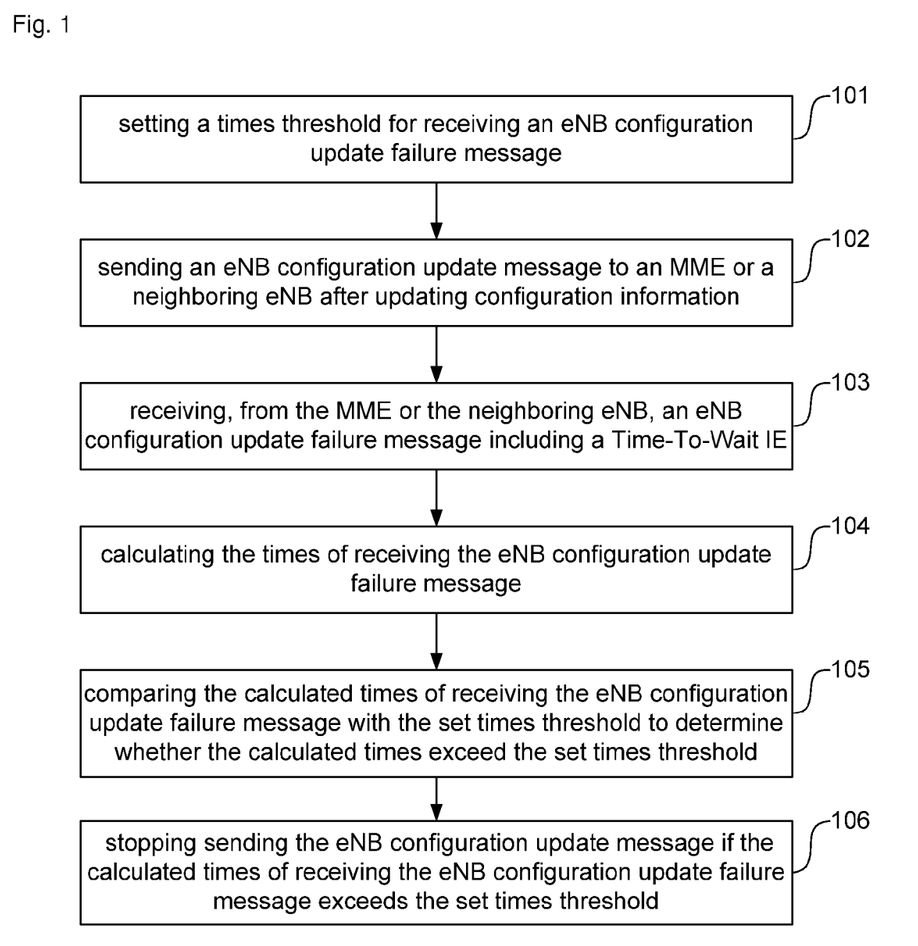
FIG. 1 is a flow chart illustrating a first method for processing a configuration update failure provided in the present disclosure.

A method for processing a configuration update failure is provided in a first embodiment of the present disclosure, as shown in FIG. 1, the method comprises the following steps:

Step 101: setting a times threshold for receiving an eNB configuration update failure message;

Step 102: sending the eNB configuration update message to an MME or a neighboring eNB after configuration information is updated;

Step 103: receiving, from the MME or a neighboring eNB, an eNB configuration update failure message including a Time-To-Wait IE;

Step 104: calculating the times of receiving the eNB configuration update failure message;

Step 105: comparing the calculated times of receiving the eNB configuration update failure message with the set times threshold to determine whether the calculated times exceed the set times threshold; and Step 106: stopping sending the eNB configuration update message if the calculated times exceeds the set times threshold.

The method further comprises the following steps of:

determining whether the configuration information is updated within the waiting time designated by the Time-To-Wait IE received from the MME or the neighboring eNB; and resetting the initial value of the times of receiving the eNB configuration update failure message if the configuration information is updated within the waiting time designated by the Time-To-Wait IE.

The above-mentioned first embodiment is described in detail by reference to an example which is not construed as a limitation to the protection scope of the present disclosure.

The times threshold k for the reception of the eNB configuration update failure message is set to be 3, and the initial value n of the eNB configuration update failure message reception times is set to be 0.

An ENB CONFIGURATION UPDATE message is sent to an MME or a neighboring eNB and a response is waited;

an ENB CONFIGURATION UPDATE FAILURE message including a Time-To-Wait IE is received from the MME or the neighboring eNB;

the initial value n is added with 1 after the ENB CONFIGURATION UPDATE FAILURE message including a Time-To-Wait IE is received;

the calculated times n of receiving ENB CONFIGURATION UPDATE FAILURE message is comprised with the threshold k (k=3), and if the calculated times n of receiving ENB CONFIGURATION UPDATE FAILURE message exceeds the threshold k, then the ENB CONFIGURATION UPDATE message stops to be sent and the flow is ended; and if the calculated times n of receiving ENB CONFIGURATION UPDATE FAILURE message does not exceed the threshold k, then a response from the MME or the neighboring eNB continues to be received, and if an ENB CONFIGURATION UPDATE FAILURE message is still received, n continues to be accumulated with 1, a comparison between n and k continues to be performed, and then a corresponding operation is performed according to the result of the comparison.

Whether the configuration information of the apparatus is changed is determined within the time length designated by the received Time-To-Wait IE, and the times n of receiving the ENB CONFIGURATION UPDATE FAILURE message is reset to be 0 if the configuration information of the apparatus is changed within the time length designated by the received Time-To-Wait IE.

Figure 2:
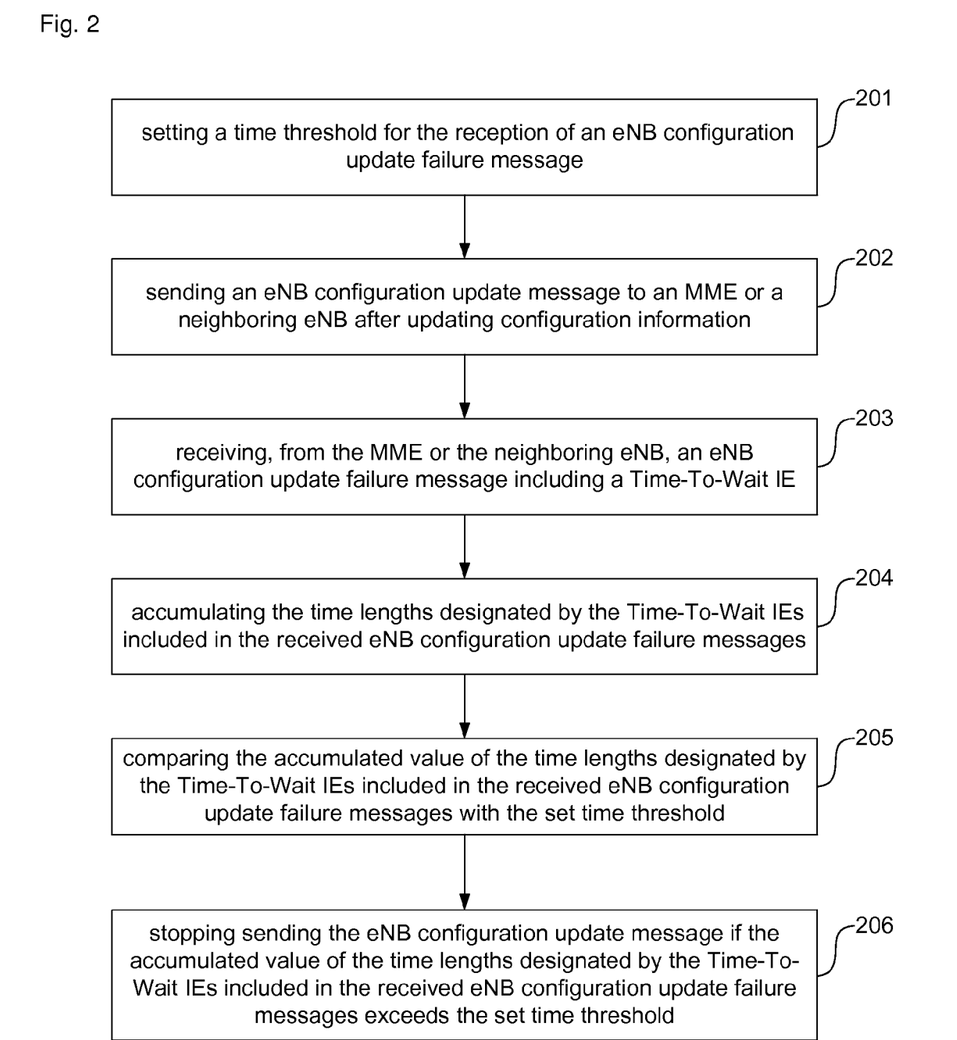
FIG. 2 is a flow chart illustrating a second method for processing a configuration update failure provided in the present disclosure.

Different from the method for processing a configuration update failure provided in the first embodiment of the present disclosure, a method for processing a configuration update failure provided in the second embodiment of the present disclosure refers to accumulate the time lengths designated by the Time-To-Wait IEs and stop sending the ENB CONFIGURATION UPDATE message when the accumulated time length exceeds the time threshold. As shown in FIG. 2, the method for processing a configuration update failure provided in the second embodiment of the present disclosure comprises:

Step 201: setting a time threshold;

Step 202: sending an eNB configuration update message to an MME or a neighboring eNB after configuration information is updated;

Step 203: receiving, from the MME or the neighboring eNB, an eNB configuration update failure message including a Time-To-Wait IE;

Step 204: accumulating the time lengths designated by the Time-To-Wait IEs included in the received eNB configuration update failure messages;

Step 205: comparing the accumulated value of the time lengths designated by the Time-To-Wait IEs included in the received eNB configuration update failure messages with the set time threshold to determine whether the accumulated value of the time lengths exceeds the set time threshold; and Step 206: stopping sending the eNB configuration update message if the accumulated value of the time lengths exceeds the set time threshold.

The method further comprises:

determining whether the configuration information is updated within the time length designated by the received Time-To-Wait IE sent by the MME or the neighboring eNB; and resetting the initial value of the time length if the configuration information is updated within the time length designated by the Time-To-Wait IE.

The above-mentioned second embodiment is described in detail by reference to the following example which is not construed as a limitation to the protection scope of the present disclosure.

The time threshold k is set to be 45 ms, and the initial value n of the time length is set to be 0 ms.

An ENB CONFIGURATION UPDATE message is sent to an MME or a neighboring eNB and a response is waited;

an ENB CONFIGURATION UPDATE FAILURE message including a Time-To-Wait IE is received from the MME or the neighboring eNB;

the initial value n is added with the time length designated by the Time-To-Wait IE after the ENB CONFIGURATION UPDATE FAILURE message including the Time-To-Wait IE is received;

the accumulated value of the time lengths designated by the Time-To-Wait IEs in the received ENB CONFIGURATION UPDATE FAILURE messages is compared with the threshold k (k=45 ms), and if the accumulated value of the time lengths exceeds the threshold k, then the ENB CONFIGURATION UPDATE message stops to be sent and the flow is ended; and if the accumulated value of the time lengths does not exceed the threshold k, then a response continues to be received from the MME or neighboring eNB, and if an ENB CONFIGURATION UPDATE FAILURE message is still received, n continues to be accumulated with the time length designated by the Time-To-Wait IE, a comparison between n and k continues to be performed, and then a corresponding operation is performed according to the result of the comparison.

Whether the configuration information is changed is determined within the time length designated by the received Time-To-Wait IE, and the value of n is reset to be 0 if the configuration information is changed within the time length designated by the received Time-To-Wait IE.

Figure 3:
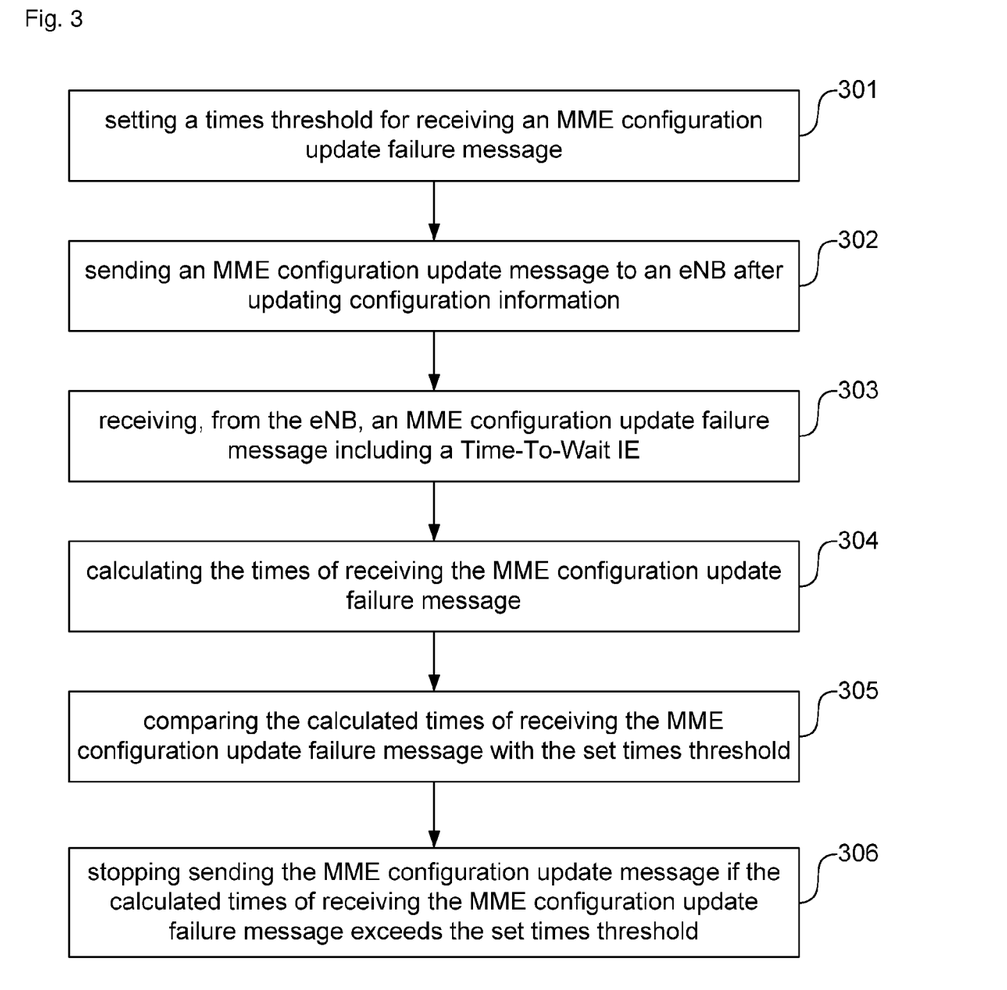
FIG. 3 is a flow chart illustrating a third method for processing a configuration update failure provided in the present disclosure.

A method for processing a configuration update failure is provided in a third embodiment of the present disclosure, as shown in FIG. 3, the method comprises the following steps:

Step 301: setting a times threshold for receiving an MME configuration update failure message;

Step 302: sending the MME configuration update message to an eNB after configuration information is updated;

Step 303: receiving, from the eNB, an MME configuration update failure message including a Time-To-Wait IE;

Step 304: calculating the times of receiving the MME configuration update failure message;

Step 305: comparing the calculated times of receiving the MME configuration update failure message with the set times threshold to determine whether the calculated times exceed the set times threshold; and Step 306: stopping sending the MME configuration update message if the calculated times exceeds the set times threshold.

Further, the method comprises the following steps of:

determining whether the configuration information is updated within the waiting time designated by the received Time-To-Wait IE sent by the eNB; and resetting the initial value of the times of receiving the MME configuration update failure message if the configuration information is updated within the waiting time designated by the Time-To-Wait IE.

The above-mentioned third embodiment is described in detail by reference to the following example which is not construed as a limitation to the protection scope of the present disclosure.

The times threshold t for the reception of an MME configuration update failure message is set to be 4, and the initial value "counter" of the times of receiving the MME configuration update failure message reception times is set to be 0.

An MME CONFIGURATION UPDATE message is sent to an eNB after configuring information and a response is waited;

an MME CONFIGURATION UPDATE FAILURE message including a Time-To-Wait IE is received from the eNB;

the counter is added with 1 after the MME CONFIGURATION UPDATE FAILURE message including a Time-To-Wait IE is received;

the calculated times "counter" of receiving the MME CONFIGURATION UPDATE FAILURE message is compared with the threshold t (t=4), and if the calculated times "counter" exceeds the threshold t, then the MME CONFIGURATION UPDATE message stops to be sent and the flow is ended; and if the calculated times "counter" does not exceed the threshold t, a response from the eNB continues to be received, and if an MME CONFIGURATION UPDATE FAILURE message is still received, the "counter" is continues to be accumulated with 1, a comparison between counter and t continues to be performed, and then a corresponding operation is performed according to the result of the comparison.

Whether the configuration information is changed is determined within the time length designated by the received Time-To-Wait IE, and the value of counter is reset to be 0 if the configuration information is changed within the time length designated by the received Time-To-Wait IE.

Figure 4:
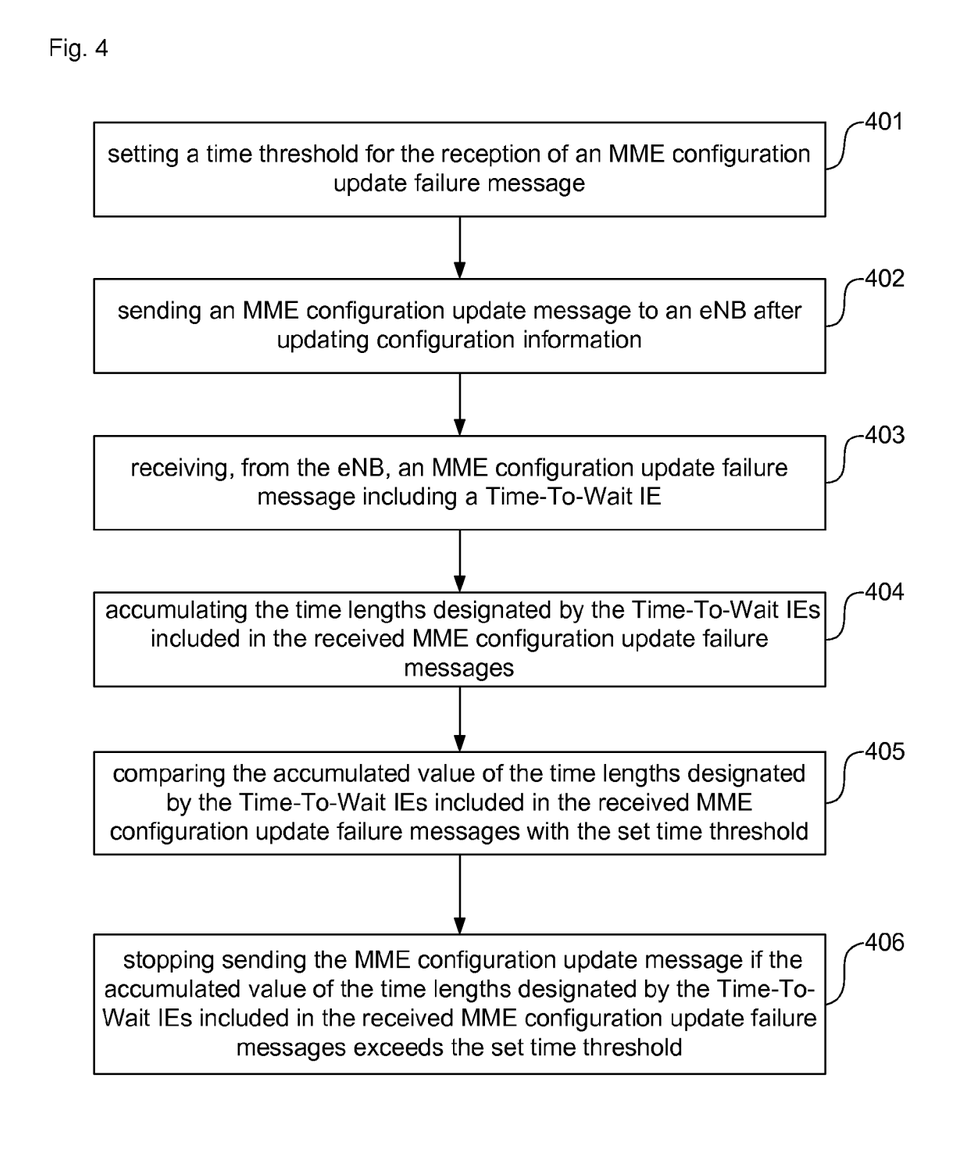
FIG. 4 is a flow chart illustrating a fourth method for processing a configuration update failure provided in the present disclosure.

Different from the method for processing a configuration update failure provided in the third embodiment of the present disclosure, a method for processing a configuration update failure provided in the fourth embodiment of the present disclosure refers to accumulate the time lengths designated by the Time-To-Wait IEs and stops sending the ENB CONFIGURATION UPDATE message when the accumulated time length exceeds the time threshold. As shown in FIG. 4, the method for processing a configuration update failure is provided in the fourth embodiment of the present disclosure, the method comprises the following steps:

Step 401: setting a time threshold;

Step 402: sending an MME configuration update message to an eNB after configuration information is updated;

Step 403: receiving, from the eNB, an MME configuration update failure message including a Time-To-Wait IE;

Step 404: accumulating the time lengths designated by the Time-To-Wait IEs included in the received MME configuration update failure messages;

Step 405: comparing the accumulated value of the time lengths designated by the Time-To-Wait IEs included in the received MME configuration update failure messages with the set time threshold to determine whether the accumulated value of the time lengths exceeds the set time threshold; and Step 406: stopping sending the MME configuration update message if the accumulated value of the time lengths exceeds the set time threshold.

Further, the method comprises the following steps of:

determining whether the configuration information is updated within the time length designated by the received Time-To-Wait IE sent by the eNB; and resetting the initial value of the time length if the configuration information is updated within the time length by the Time-To-Wait IE.

The above-mentioned fourth embodiment is described in detail by reference to the following example which is not construed as a limitation to the protection scope of the present disclosure.

The time threshold t is set to be 45 ms, and the initial value counter of receiving the MME configuration update failure message is set to be 0.

An MME CONFIGURATION UPDATE message is sent to an eNB after configuring information and a response is waited;

an MME CONFIGURATION UPDATE FAILURE message including a Time-To-Wait IE is received from the eNB;

the initial value counter is added with the time length designated by the Time-To-Wait IE after the MME CONFIGURATION UPDATE FAILURE message including the Time-To-Wait IE is received;

the calculated time "counter" of receiving MME configuration update failure message is compared with the threshold t (t=45 ms), and if the calculated time "counter" exceeds the threshold t, then the MME configuration update message stops to be sent and the flow is ended; and the calculated time counter does not exceed the threshold t, a response continues to be received from the eNB, and if an MME CONFIGURATION UPDATE FAILURE message is still received, counter continues to be accumulated with the time length designated by the Time-To-Wait IE, a comparison between counter and t continues to be performed, and then a corresponding operation is performed according to the result of the comparison.

Whether the configuration information is changed is determined within the time length designated by the received Time-To-Wait IE, and the value of counter is reset to be 0 if the configuration information is changed within the time length designated by the received Time-To-Wait IE.

Figure 5:
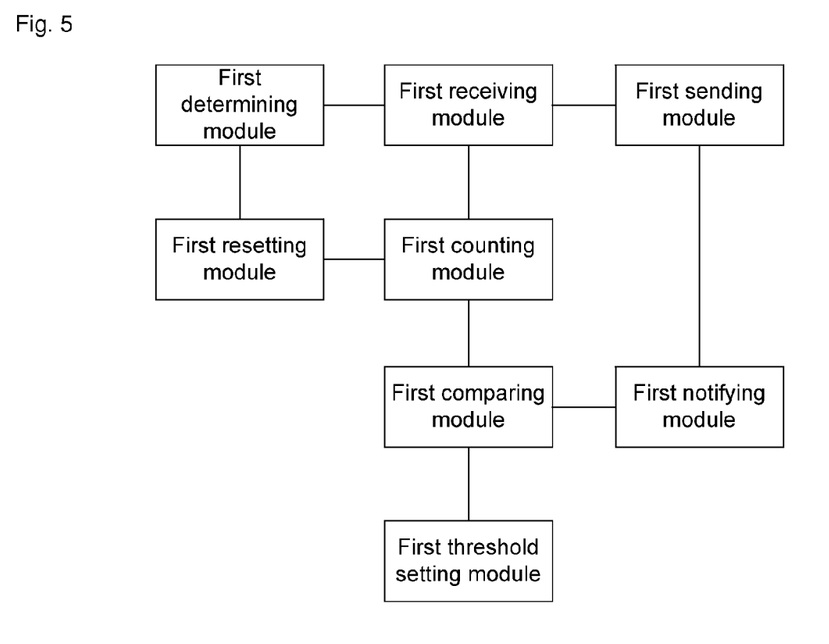
FIG. 5 is a structural diagram illustrating an apparatus for processing a configuration update failure provided in the present disclosure.

As shown in FIG. 5, an apparatus for processing a configuration update failure is provided in the fifth embodiment of the present disclosure, the apparatus comprises:

a first sending module, connected with a first receiving module for sending an eNB configuration update message to an MME or a neighboring eNB after configuration information is updated;

a first receiving module for receiving, from the MME or the neighboring eNB, an eNB configuration update failure message including a Time-To-Wait IE;

a first counting module, connected with the first receiving module, for calculating the times of receiving the eNB configuration update failure message for the first receiving module;

a first threshold setting module for setting a times threshold for receiving the eNB configuration update failure message;

a first comparing module, connected with the first counting module and the first threshold setting module for compare the times of receiving the eNB configuration update failure message calculated by the first counting module with the times threshold set by the first threshold setting module; and a first notifying module, connected with the first sending module and the first comparing module for notifying the first sending module to stop sending the eNB configuration update message when the first compassion module determines that the times of receiving the eNB configuration update failure message calculated by the first counting module exceed the times threshold set by the first threshold setting module.

Further, the apparatus comprises:

a first determining module, connected with the first receiving module, used for determining whether the configuration information is updated within the waiting time designated by the Time-To-Wait IE received by the first receiving module from the MME or the neighboring eNB; and a first resetting module, connected with the first determining module for resetting the initial value of the first counting module when the first determining module determines that the configuration information is updated within the waiting time designated by the Time-To-Wait IE received by the first receiving module from the MME or the neighboring eNB.

Wherein the apparatus for processing a configuration update failure may be an evolved Node B.

The above-mentioned fifth embodiment is described in detail by reference to the following example which is not construed as a limitation to the protection scope of the present disclosure.

The first threshold setting module sets a times threshold k for the reception of an eNB configuration update failure message to be 3, and the first counting module sets its own initial value n to be 0.

After configuring information, the first sending module sends an ENB CONFIGURATION UPDATE message to an MME or a neighboring eNB and then waits for a response;

the first receiving module receives, from the MME or the neighboring eNB, an ENB CONFIGURATION UPDATE FAILURE message including a Time-To-Wait IE;

the first counting module enables the initial value n to add 1 after the first receiving module receives the ENB CONFIGURATION UPDATE FAILURE message including a Time-To-Wait IE;

the first comparing module compares the times n of receiving the ENB CONFIGURATION UPDATE FAILURE message calculated by the first counting module with the threshold k (k=3), and if the calculated times n exceeds the threshold k, then the first notifying module notifies the first sending module to stop sending the ENB CONFIGURATION UPDATE message and then ends the flow; otherwise, the first comparing module continues to receive a response from the MME or the neighboring eNB, and if an ENB CONFIGURATION UPDATE FAILURE message is still received, the first counting module continues to accumulate n with 1, and the first comparing module compares n with k and then performs a corresponding operation according to the result of the comparison.

The first determining module may determine whether the configuration information of the apparatus is changed within the time length designated by the Time-To-Wait IE received by the first receiving module, and the first resetting module resets the value n of the first counting module to be 0 if the first determining module determines that the configuration information of the apparatus is changed within the time length designated by the Time-To-Wait IE received by the first receiving module.

It should be noted that, the first counting module may be an adder or a subtractor.

Different from the apparatus for processing a configuration update failure provided in the fifth embodiment of the present disclosure, an apparatus for processing a configuration update failure provided in the sixth embodiment of the present disclosure refers to accumulate the time lengths designated by the Time-To-Wait IEs and stop is sending the ENB CONFIGURATION UPDATE message when the accumulated time length exceeds the time threshold. As shown in FIG. 5, the apparatus for processing a configuration update failure provided in the sixth embodiment of the present disclosure comprises:

a first sending module, connected with a first receiving module for sending an eNB configuration update message to an MME or a neighboring eNB after configuration information is updated;

a first receiving module for receiving, from the MME or the neighboring eNB, an eNB configuration update failure message including a Time-To-Wait IE;

a first counting module, connected with the first receiving module for accumulating the time lengths designated by the Time-To-Wait IEs included in the eNB configuration update failure messages received by the first receiving module;

a first threshold setting module for setting a time threshold;

a first comparing module, connected with the first counting module and the first threshold setting module for comparing the accumulated value of the time lengths designated by the Time-To-Wait IEs included in the received eNB configuration update failure messages with the time threshold set by the first threshold setting module; and a first notifying module, connected with the first comparing module for notifying the first sending module to stop sending the eNB configuration update message when the first comparing module determines that the accumulated value of the time lengths exceeds the set time threshold.

Further, the apparatus comprises:

a first determining module, connected with the first receiving module for determining whether the configuration information is updated within the time length designated by the Time-To-Wait IE received by the first receiving module from the MME or the neighboring eNB; and a first resetting module, connected with the first determining module for resetting the initial value of the first counting module when the first determining module determines that the configuration information is updated within the time length designated by the Time-To-Wait IE received by the first receiving module from the MME or the neighboring eNB.

The above-mentioned sixth embodiment is described in detail by reference to the following example which is not construed as a limitation to the protection scope of the present disclosure.

The first threshold setting module sets the time threshold k to be 45 ms, and the first counting module sets its own initial value n to be 0 ms.

After configuring information, the first sending module sends an ENB CONFIGURATION UPDATE message to an MME or a neighboring eNB and then waits for a response;

the first receiving module receives, from the MME or the neighboring eNB, an ENB CONFIGURATION UPDATE FAILURE message including a Time-To-Wait IE;

the first counting module enables the initial value n to add the time length designated by the Time-To-Wait IE after the first receiving module receives the ENB CONFIGURATION UPDATE FAILURE message including a Time-To-Wait IE;

the first comparing module compares the accumulated value of the time lengths designated by the Time-To-Wait IEs included in the received ENB CONFIGURATION UPDATE FAILURE messages with the time threshold k (k=45 ms), and if the accumulated value of the time lengths exceeds the threshold k, then the first notifying module notifies the first sending module to stop sending the eNB configuration update message and then ends the flow; otherwise, the first comparing module continues to receive a response from the MME or the neighboring eNB, and if an ENB CONFIGURATION UPDATE FAILURE message is still received, the first counting module continues to accumulate n with the time length designated by the Time-To-Wait IE, and the first comparing module compares n with k and then performs a corresponding operation according to the result of the comparison.

The first determining module may determine whether the configuration information of the apparatus is changed within the time length designated by the Time-To-Wait IE received by the first receiving module, and the first resetting module resets the value n of the first counting module to be 0 if the first determining module determines that the configuration information of the apparatus is changed within the time length designated by the Time-To-Wait IE received by the first receiving module.

Figure 6:
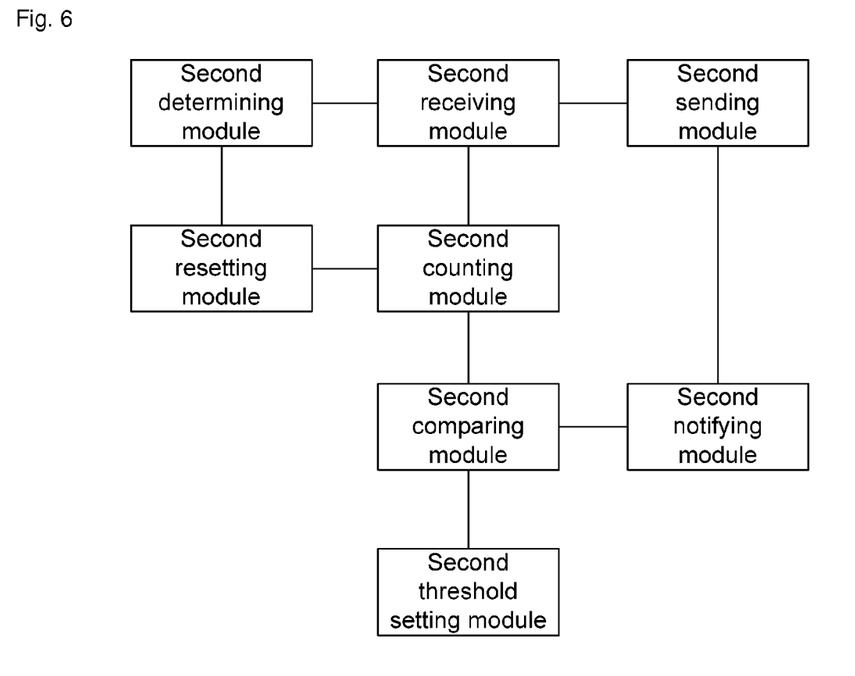
FIG. 6 is a structural diagram illustrating another apparatus for processing a configuration update failure provided in the present disclosure.

As shown in FIG. 6, an apparatus for processing a configuration update failure is provided in the seventh embodiment of the present disclosure, the apparatus comprises:

a second sending module, connected with a second receiving module for sending an MME configuration update message to an eNB after configuration information is updated;

the second receiving module for receiving, from the eNB, an MME configuration update failure message including a Time-To-Wait IE;

a second counting module, connected with the second receiving module for calculating the times of receiving the MME configuration update failure message for the second receiving module;

a second threshold setting module for setting a times threshold for receiving the MME configuration update failure message;

a second comparing module, connected with the second counting module and the second threshold setting module for comparing the times of receiving the MME configuration update failure message calculated by the second counting module with the times threshold set by the second threshold setting module; and a second notifying module, connected with the second comparing module for notifying the second sending module to stop sending the MME configuration update message when the second comparing module determines that the calculated times exceeds the set times threshold.

Further, the apparatus comprises:

a second determining module, connected with the second receiving module for determining whether the configuration information is updated within the waiting time designated by the Time-To-Wait IE received by the second receiving module from the eNB; and a second resetting module, connected with the second determining module for resetting the initial value of the second counting module when the second determining module determines that the configuration information is updated within the waiting time designated by the Time-To-Wait IE received by the second receiving module from the eNB.

Wherein the apparatus for processing a configuration update failure may be an MME.

The above-mentioned seventh embodiment is described in detail by reference to the following example which is not construed as a limitation to the protection scope of is the present disclosure.

The second threshold setting module sets a times threshold t for the reception of an MME configuration update failure message to be 4, and the second counting module sets its own initial value counter to be 0.

The second sending module sends an MME CONFIGURATION UPDATE message to an eNB after configuring information and then waits for a response;

the second receiving module receives, from the eNB, an MME CONFIGURATION UPDATE FAILURE message including a Time-To-Wait IE;

the second counting module enables the initial value counter to add 1 after the second receiving module receives the MME CONFIGURATION UPDATE FAILURE message including a Time-To-Wait IE; and the second comparing module compares the times counter of receiving the MME CONFIGURATION UPDATE FAILURE message calculated by the second counting module with the threshold t (t=4), and if the calculated times of receiving the MME CONFIGURATION UPDATE FAILURE message exceeds the threshold t, then the second notifying module notifies the second sending module to stop sending the MME CONFIGURATION UPDATE message and then ends the flow; otherwise, the second receiving module continues to receive a response from the eNB, and if an ENB CONFIGURATION UPDATE FAILURE message is still received, the second counting module continues to accumulate counter with 1, and the second comparing module compares counter with t and performs a corresponding operation according to the result of the comparison.

The second determining module determines whether the configuration information of the apparatus is changed within the time length designated by the Time-To-Wait IE received by the second receiving module, and the second resetting module resets the value counter of the second counting module to be 0 if the second determining module determines that the configuration information of the apparatus is changed within the time length designated by the Time-To-Wait IE received by the second receiving module.

Different from the apparatus for processing a configuration update failure provided in the seventh embodiment of the present disclosure, an apparatus for processing a configuration update failure provided in the eighth embodiment of the present disclosure refers to accumulate the time lengths designated by the Time-To-Wait IEs and stops sending the ENB CONFIGURATION UPDATE message when the accumulated value of the time lengths exceeds a time threshold. As shown in FIG. 6, the apparatus for processing a configuration update failure provided in the eighth embodiment of the present disclosure comprises:

a second sending module, connected with a second receiving module for sending an MMS configuration update message to an eNB after configuration information is updated;

the second receiving module for receiving, from the eNB, an MME configuration update failure message including a Time-To-Wait IE;

a second counting module, connected with the first receiving module for accumulating the time lengths designated by the Time-To-Wait IEs included in the MME configuration update failure message received by the second receiving module;

a second threshold setting module for setting a time threshold;

a second comparing module, connected with the second counting module and the second threshold setting module for comparing the accumulated value of the time lengths designated by the Time-To-Wait IEs included in the MMS configuration update failure messages calculated by the second counting module with the time threshold set by the second threshold setting module; and a second notifying module, connected with the second comparing module for notifying the second sending module to stop sending the MMS configuration update message when the second comparing module determines that the accumulated value of the time lengths exceeds the set time threshold.

Further, the apparatus comprises:

a second determining module, connected with the second receiving module, for determining whether the configuration information is updated within the time length designated by the Time-To-Wait IE received by the second receiving module from the eNB; and a second resetting module, connected with the second determining module for resetting the initial value of the second counting module when the second determining module determines that the configuration information is updated within the time length designated by the Time-To-Wait IE received by the second receiving module from the eNB.

The above-mentioned eighth embodiment is described in detail by reference to the following example which is not construed as a limitation to the protection scope of the present disclosure.

The second threshold setting module sets the time threshold t to be 45 ms, and the second counting module sets its own initial value counter to be 0.

The second sending module sends an MME CONFIGURATION UPDATE message to an eNB after configuring information and then waits for a response;

the second receiving module receives, from the eNB, an MME CONFIGURATION UPDATE FAILURE message including a Time-To-Wait IE;

the second counting module enables the initial value counter to add the time length designated by the Time-To-Wait IE after the second receiving module receives the MME CONFIGURATION UPDATE FAILURE message including a Time-To-Wait IE;

the second comparing module compares the time counter of receiving the MME CONFIGURATION UPDATE FAILURE message calculated by the second counting module with the threshold t (t=45 ms), and if the calculated time counter of receiving the MME CONFIGURATION UPDATE FAILURE message exceeds the threshold t, then the second notifying module notifies the second sending module to stop sending the MME CONFIGURATION UPDATE message and then ends the flow; otherwise, the second receiving module continues to receive a response from the eNB, and if an MME CONFIGURATION UPDATE FAILURE message is still received, the second counting module continues to accumulate counter with the time designated by the Time-To-Wait IE, and the second comparing module compares counter with t and performs a corresponding operation according to the result of the comparison.

The second determining module determines whether the configuration information of the apparatus is changed within the time length designated by the Time-To-Wait IE received by the second receiving module, and the second resetting module resets the value counter of the second counting module to be 0 if the second determining module determines that the configuration information of the apparatus is changed within the time length designated by the Time-To-Wait IE received by the second receiving module.

Figure 7:
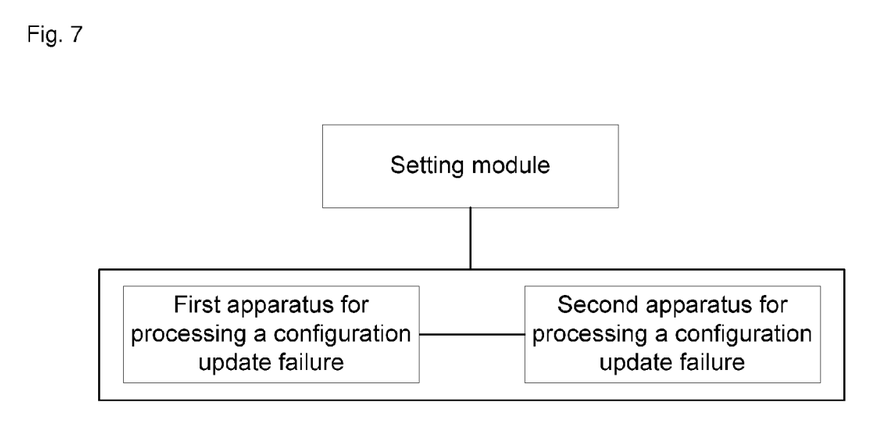
FIG. 7 is a structural diagram illustrating a system for processing a configuration update failure provided in the present disclosure.

As shown in FIG. 7, a system for processing a configuration update failure is provided in the ninth embodiment of the present disclosure, the system comprises:

a setting module for setting a times threshold;

a first apparatus for processing a configuration update failure, and a second apparatus for processing a configuration update failure connected with the first apparatus for processing a configuration update failure, wherein the first apparatus for processing a configuration update failure sends an eNB configuration update message to the second apparatus for processing a configuration update failure after configuration information is updated; receives, from the second apparatus for processing a configuration update failure, an eNB configuration update failure message including a Time-To-Wait IE; calculates the times of receiving the eNB configuration update failure message; compares the calculated times of receiving the eNB configuration update failure message with the set times threshold; and stops sending the eNB configuration update message if the calculated times exceeds the set times threshold; and after receiving the eNB configuration update message from the first apparatus for processing a configuration update failure, the second apparatus for processing a configuration update failure sends the eNB configuration update failure message including the Time-To-Wait IE to the first apparatus for processing a configuration update failure when an update is failed.

As shown in FIG. 7, a system for processing a configuration update failure is provided in the tenth embodiment of the present disclosure, the system comprises:

a setting module for setting a times threshold;

a first apparatus for processing a configuration update failure, and a second apparatus for processing a configuration update failure connected with the first apparatus for processing a configuration update failure, wherein the first apparatus for processing a configuration update failure sends an MME configuration update message to the second apparatus for processing a configuration update failure after configuration information is updated; receives, from the second apparatus for processing a configuration update failure, an MME configuration update failure message including a Time-To-Wait IE; calculates the times of receiving the MME configuration update failure message; compares the calculated times with the set times threshold; and stops sending the MME configuration update message if the calculated times exceeds the set times threshold; and the second apparatus for processing a configuration update failure receives the MME configuration update message and sends the first apparatus for processing a configuration update failure the MME configuration update failure message including the Time-To-Wait IE if an update is failed.

As shown in FIG. 7, a system for processing a configuration update failure is provided in the eleventh embodiment of the present disclosure, the system comprises:

a setting module is configured to set a time threshold;

a first apparatus for processing a configuration update failure, and a second apparatus for processing a configuration update failure connected with the first apparatus for processing a configuration update failure, wherein the first apparatus for processing a configuration update failure sends an eNB configuration update message to the second apparatus for processing a configuration update failure after configuration information is updated; receives, from the second apparatus for processing a configuration update failure, eNB configuration update failure messages including Time-To-Wait IEs, accumulates the time lengths designated by the Time-To-Wait IEs included in the received eNB configuration update failure messages; compares the accumulated value of the time lengths designated by the Time-To-Wait IEs with the set time threshold; and stops sending the eNB configuration update message if the accumulated value of the time lengths exceeds the set time threshold; and after receiving the eNB configuration update message from the first apparatus for processing a configuration update failure, the second apparatus for processing a configuration update failure sends the eNB configuration update failure message including the Time-To-Wait IE to the first apparatus for processing a configuration update failure when an update is failed.

As shown in FIG. 7, a system for processing a configuration update failure is provided in the twelfth embodiment of the present disclosure, the system comprises:

a setting module is configured to set a time threshold;

a first apparatus for processing a configuration update failure, and a second apparatus for processing a configuration update failure connected with the first apparatus for processing a configuration update failure, wherein the first apparatus for processing a configuration update failure sends an MME configuration update message to the second apparatus for processing a configuration update failure after configuration information is updated; receives, from the second apparatus for processing a configuration update failure, MME configuration update failure messages including Time-To-Wait IEs; accumulates the time lengths designated by the Time-To-Wait IEs included in the received MME configuration update failure messages; compares the accumulated value of the time lengths designated by the Time-To-Wait IEs with the set time threshold; and stops sending the MME configuration update message if the accumulated value of the time lengths exceeds the set time threshold; and the second apparatus for processing a configuration update failure receives the MME configuration update message and sends the MME configuration update failure message including the Time-To-Wait IE to the first apparatus for processing a configuration update failure when an update is failed.

By setting a times threshold or a time threshold to stop the sending of a configuration update message when the accumulated times of receiving a configuration update failure message including a Time-To-Wait IE are more than the times threshold or the accumulated time for receiving a configuration update failure message including a Time-To-Wait IE is longer than the time threshold, the present disclosure solves the problem that the same update process is called repeatedly in the case that a configuration update failure message including a Time-To-Wait IE is always received from the opposite terminal and the configuration of the initiating terminal is not changed, and can thereby relieve the load of a system and improve the robustness and stability of the system.

What is claimed is:

1. A method for processing a configuration update failure, setting a times threshold for receiving an Evolved Node B (eNB) configuration update failure message, the method comprising:

sending an eNB configuration update message to an Mobility Management Entity (MME) or a neighboring eNB after configuration information is updated;

receiving, from the MME or the neighboring eNB, an eNB configuration update failure message including a Time-To-Wait Information Element (IE);

calculating times of receiving the eNB configuration update failure message;

comparing the calculated times of receiving the eNB configuration update failure message with the set times threshold to determine whether the calculated times exceed the set times threshold; and stopping sending the eNB configuration update message if the calculated times exceed the set times threshold.

2. The method for processing a configuration update failure according to claim 1, further comprising:

determining whether the configuration information is updated within a waiting time designated by the Time-To-Wait IE; and resetting an initial value of the times of receiving the eNB configuration update failure message if the configuration information is updated within the waiting time designated by the Time-To-Wait IE.

3. A method for processing a configuration update failure, setting a times threshold for receiving an Mobility Management Entity (MME) configuration update failure message, comprising:

sending an MME configuration update message to an Evolved Node B (eNB) after configuration information is updated;

receiving, from the eNB, an MME configuration update failure message including a Time-To-Wait Information Element (IE);

calculating times of receiving the MME configuration update failure message;

comparing the calculated times of receiving the MME configuration update failure message with the set times threshold to determine whether the calculated times exceed the set times threshold; and stopping sending the MME configuration update message if the calculated times exceed the set times threshold.

4. The method for processing a configuration update failure according to claim 3, further comprising:

determining whether the configuration information is updated within the waiting time designated by the Time-To-Wait IE; and resetting an initial value of the times of receiving the MME configuration update failure message if the configuration information is updated within the waiting time designated by the Time-To-Wait IE.

5. A method for processing a configuration update failure, setting a time threshold, comprising:

sending an Evolved Node B (eNB) configuration update message to an Mobility Management Entity (MME) or a neighboring eNB after configuration information is updated;

receiving, from the MME or the neighboring eNB, an eNB configuration update failure message including a Time-To-Wait Information Element (IE);

accumulating time lengths designated by the Time-To-Wait IEs included in the received eNB configuration update failure messages;

comparing the accumulated value of the time lengths designated by the Time-To-Wait IEs included in the received eNB configuration update failure messages with the set time threshold to determine whether the accumulated value of the time lengths exceeds the set time threshold; and stopping sending the eNB configuration update message if the accumulated value of the time lengths exceeds the set time threshold.

6. The method for processing a configuration update failure according to claim 5, further comprising:
determining whether the configuration information is updated within the time length designated by the Time-To-Wait IE; and
resetting an initial value of the time length if the configuration information is updated within the time length designated by the Time-To-Wait IE.

7. A method for processing a configuration update failure, setting a time threshold, comprising:
sending an Mobility Management Entity (MME) configuration update message to an Evolved Node B (eNB) after configuration information is updated;
receiving, from the eNB, an MME configuration update failure message including a Time-To-Wait Information Element (IE);
accumulating time lengths designated by the Time-To-Wait IEs included in the received MME configuration update failure messages;
comparing the accumulated value of the time lengths designated by the Time-To-Wait IEs included in the received eNB configuration update failure messages with the set time threshold to determine whether the accumulated value of the time lengths exceeds the set time threshold; and stopping sending the MME configuration update message if the accumulated value of the time lengths designated by the Time-To-Wait IEs exceeds the set time threshold.

8. The method for processing a configuration update failure according to claim 7, further comprising:
determining whether the configuration information is updated within the time length designated by the Time-To-Wait IE received from the eNB; and resetting an initial value of the accumulated time lengths if the configuration information is updated within the time length designated by the Time-To-Wait IE received from the eNB.

9. An apparatus for processing a configuration update failure, comprising a first sending module, a first receiving module, a first counting module, a first threshold setting module, a first comparing module and a first notifying module;
wherein the first threshold setting module is configured to set a times threshold for receiving an Evolved Node B (eNB) configuration update failure message;
the first sending module, connected with the first receiving module, is configured to send an eNB configuration update message to an Mobility Management Entity (MME) or a neighboring eNB after configuration information is updated;
the first receiving module is configured to receive, from the MME or the neighboring eNB, an eNB configuration update failure message including a Time-To-Wait Information Element (IE);
the first counting module, connected with the first receiving module, is configured to calculate times of receiving the eNB configuration update failure message by the first receiving module;
the first comparing module, connected with the first counting module and the first threshold setting module, is configured to compare the times of receiving the eNB configuration update failure message which are calculated by the first counting module with the times threshold set by the first threshold setting module to determine whether the calculated times exceed the set times threshold; and
the first notifying module, connected with the first sending module and the first comparing module, is configured to notify the first sending module to stop sending the eNB configuration update message when the first compassion module determines that the times of receiving the eNB configuration update failure message exceed the times threshold set by the first threshold setting module.

10. The apparatus for processing a configuration update failure according to claim 9, further comprising: a first determining module and a first resetting module;
wherein the first determining module, connected with the first receiving module, is configured to determine whether the configuration information is updated within the waiting time designated by the Time-To-Wait IE; and
the first resetting module, connected with the first determining module, is configured to reset an initial value of the times of receiving the eNB configuration update failure message which are calculated by the first counting module when the first determining module determines that the configuration information is updated within the waiting time designated by the Time-To-Wait IE.

11. An apparatus for processing a configuration update failure, comprising a second sending module, a second receiving module, a second counting module, a second threshold setting module, a second comparing module and a second notifying module;
wherein the second threshold setting module is configured to set a times threshold for receiving an Mobility Management Entity (MME) configuration update failure message;
the second sending module, connected with the second receiving module, is configured to send an MME configuration update message to an Evolved Node B (eNB) after configuration information is updated;
the second receiving module is configured to receive, from the eNB, an MME configuration update failure message including a Time-To-Wait Information Element (IE);
the second counting module, connected with the second receiving module, is configured to calculate times of receiving the MME configuration update failure message by the second receiving module;
the second comparing module, connected with the second counting module and the second threshold setting module, is configured to compare the times of receiving the MME configuration update failure message which are calculated by the second counting module with the times threshold set by the second threshold setting module to determine whether the calculated times exceed the set times threshold; and
the second notifying module, connected with the second comparing module, is configured to notify the second sending module to stop sending the MME configuration update message when the second comparing module determines that the times of receiving the MME configuration update failure message exceeds the times threshold set by the second threshold setting module.

12. The apparatus for processing a configuration update failure according to claim 11, further comprising: a second determining module and a second resetting module;
wherein the second determining module, connected with the second receiving module, is configured to determine whether the configuration information is updated within the waiting time designated by the Time-To-Wait IE; and the second resetting module, connected with the second determining module, is configured to reset an initial value of the times of receiving the eNB configuration update failure message which are calculated by the second counting module when the second determining module determines that the configuration information is updated within the waiting time designated by the Time-To-Wait IE.

13. An apparatus for processing a configuration update failure, comprising a first sending module, a first receiving module, a first counting module, a first threshold setting module, a first comparing module and a first notifying module;

wherein the first threshold setting module is configured to set a time threshold;

the first sending module, connected with the first receiving module, is configured to send an Evolved Node B (eNB) configuration update message to an Mobility Management Entity (MME) or a neighboring eNB after configuration information is updated;

the first receiving module is configured to receive, from the MME or the neighboring eNB, an eNB configuration update failure message including a Time-To-Wait Information Element (IE);

the first counting module, connected with the first receiving module, is configured to accumulate time lengths designated by the Time-To-Wait IEs included in the eNB configuration update failure messages received by the first receiving module;

the first comparison module, connected with the first counting module and the first threshold setting module, is configured to compare the accumulated time length with the time threshold set by the first threshold setting module to determine whether the accumulated value of the time lengths exceeds the set time threshold; and the first notifying module, connected with the first comparing module, is configured to notify the first sending module to stop sending the eNB configuration update message when the first comparing module determines that the accumulated time length exceeds the time threshold set by the first threshold setting module.

14. The apparatus for processing a configuration update failure according to claim 13, further comprising: a first determining module and a first resetting module;

wherein the first determining module, connected with the first receiving module, is configured to determine whether the configuration information is updated within the time length designated by the Time-To-Wait IE; and the first resetting module, connected with the first determining module, is configured to reset an initial value of the time length accumulated by the first counting module when the first determining module determines that the configuration information is updated within the time length designated by the Time-To-Wait IE.

15. An apparatus for processing a configuration update failure, comprising a second sending module, a second receiving module, a second counting module, a second threshold setting module, a second comparing module and a second notifying module;

wherein the second threshold setting module is configured to set a time threshold;

the second sending module, connected with the second receiving module, is configured to send an Mobility Management Entity (MME) configuration update message to an Evolved Node B (eNB) after configuration information is updated;

the second receiving module is configured to receive, from the eNB, an MME configuration update failure message including a Time-To-Wait Information Element (IE);

the second counting module, connected with the first receiving module, is configured to accumulate time lengths designated by the Time-To-Wait IEs included in the MME configuration update failure messages received by the second receiving module;

the second threshold setting module is configured to set a time threshold for receiving the MME configuration update failure message;

the second comparison module, connected with the second counting module and the second threshold setting module, is configured to compare the accumulated time length with the time threshold set by the second threshold setting module; and the second notifying module, connected with the second comparing module, is configured to notify the second sending module to stop sending the MME configuration update message when the second comparing module determines the accumulated time length exceeds the time threshold set by the second threshold setting module.

16. The apparatus for processing a configuration update failure according to claim 15, further comprising: a second determining module and a second resetting module;

wherein the second determining module, connected with the second receiving module, is configured to determine whether the configuration information is updated within the time length designated by the Time-To-Wait IE received by the second receiving module from the eNB; and the second resetting module, connected with the second determining module, is configured to reset an initial value of the time length accumulated by the second counting module when the second determining module determines that the configuration information is updated within the time length designated by the Time-To-Wait IE.

17. A system for processing a configuration update failure, comprising: a setting module, a first apparatus for processing a configuration update failure and a second apparatus for processing a configuration update failure connected with the first apparatus for processing a configuration update failure;

wherein the setting module is configured to set a times threshold for receiving an Evolved Node B (eNB) configuration update failure message;

the first apparatus for processing a configuration update failure is configured to send an eNB configuration update message to the second apparatus for processing a configuration update failure after configuration information is updated; receive, from the second apparatus for processing a configuration update failure, an eNB configuration update failure message including a Time-To-Wait Information Element (IE); calculate times of receiving the eNB configuration update failure message; compare the calculated times of receiving the eNB configuration update failure message with the set times threshold for receiving the eNB configuration update failure message to determine whether the calculated times exceed the set times threshold; and stop sending the eNB configuration update message when the calculated times exceed the set times threshold; and the second apparatus for processing a configuration update failure is configured to receive the eNB configuration update message from the first apparatus for processing a configuration update failure, and then send the eNB configuration update failure message including the Time-To-Wait IE to the first apparatus for processing a configuration update failure when an update is failed.

18. A system for processing a configuration update failure, comprising a setting module, a first apparatus for processing a configuration update failure and a second apparatus for processing a configuration update failure connected with the first apparatus for processing a configuration update failure;
   wherein the setting module is configured to set a times threshold for receiving an Mobility Management Entity (MME) configuration update failure message;
   the first apparatus for processing a configuration update failure is configured to send an MME configuration update message to the second apparatus for processing a configuration update failure after configuration information is updated; receive, from the second apparatus for processing a configuration update failure, an MME configuration update failure message including a Time-To-Wait Information Element (IE); calculate times of receiving the MME configuration update failure message; compare the calculated times for receiving the MME configuration update failure message with the set times threshold for receiving the MME configuration update failure message to determine whether the calculated times exceed the set times threshold; and stop sending the MME configuration update message when the calculated times exceed the set times threshold; and
   the second apparatus for processing a configuration update failure is configured to receive the MME configuration update message, and send the MME configuration update failure message including the Time-To-Wait IE to the first apparatus for processing a configuration update failure when an update is failed.

19. A system for processing a configuration update failure, comprising a setting module, a first apparatus for processing a configuration update failure and a second apparatus for processing a configuration update failure connected with the first apparatus for processing a configuration update failure;
   wherein the setting module is configured to set a time threshold;
   the first apparatus for processing a configuration update failure is configured to send an Evolved Node B (eNB) configuration update message to the second apparatus for processing a configuration update failure after configuration information is updated; receive, from the second apparatus for processing a configuration update failure, an eNB configuration update failure message including a Time-To-Wait Information Element (IE); accumulate time lengths designated by the Time-To-Wait IEs included in the received eNB configuration update failure messages; compare the accumulated value of the time lengths designated by the Time-To-Wait IEs with the set time threshold to determined whether the accumulated value of the time lengths exceeds the set time threshold; and stop sending the eNB configuration update message when the accumulated value of the time lengths exceeds the set time threshold; and
   the second apparatus for processing a configuration update failure is configured to receive the eNB configuration update message from the first apparatus for processing a configuration update failure, and then send the eNB configuration update failure message including the Time-To-Wait IE to the first apparatus for processing a configuration update failure when an update is failed.

20. A system for processing a configuration update failure, comprising a setting module, a first apparatus for processing a configuration update failure and a second apparatus for processing a configuration update failure connected with the first apparatus for processing a configuration update failure;
   wherein the setting module is configured to set a time threshold;
   the first apparatus for processing a configuration update failure is configured to send an Mobility Management Entity (MME) configuration update message to the second apparatus for processing a configuration update failure after configuration information is updated; receive, from the second apparatus for processing a configuration update failure, an MME configuration update failure message including a Time-To-Wait Information Element (IE); accumulate time lengths designated by the Time-To-Wait IEs included in the received MME configuration update failure messages; compare the accumulated value of the time lengths designated by the Time-To-Wait IEs with the set time threshold to determine whether the accumulated value of the time lengths exceeds the set time threshold; and stop sending the MME configuration update message when the accumulated value of the time lengths exceeds the set time threshold; and
   the second apparatus for processing a configuration update failure is configured to receive the MME configuration update message and send the MME configuration update failure message including the Time-To-Wait IE to the first apparatus for processing a configuration update failure when an update is failed.

* * * * *